(12) United States Patent
Chou et al.

(10) Patent No.: US 8,197,899 B2
(45) Date of Patent: Jun. 12, 2012

(54) METHOD FOR MANUFACTURING PATTERNED THIN-FILM LAYER

(75) Inventors: Ching-Yu Chou, Hsinchu (TW); Stephen Ko-Chiang Chien, Redwood City, CA (US); Yu-Ning Wang, Hsinchu (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 519 days.

(21) Appl. No.: 12/422,251

(22) Filed: Apr. 11, 2009

(65) Prior Publication Data

US 2009/0256875 A1 Oct. 15, 2009

(30) Foreign Application Priority Data

Apr. 11, 2008 (TW) ................................ 97113239 A

(51) Int. Cl.
*B05D 1/26* (2006.01)
(52) U.S. Cl. ......... 427/258; 427/261; 427/265; 427/266
(58) Field of Classification Search .................. 427/258, 427/261, 265, 266
See application file for complete search history.

(56) References Cited

U.S. PATENT DOCUMENTS

| 4,680,596 | A  | * | 7/1987  | Logan ............................. 347/15 |
| 6,367,908 | B1 | * | 4/2002  | Serra et al. ....................... 347/37 |
| 2002/0136823 | A1 | * | 9/2002 | Miyashita et al. .............. 427/66 |
| 2007/0296773 | A1 | * | 12/2007 | Sharma et al. ................. 347/75 |

FOREIGN PATENT DOCUMENTS

| JP | 2003279724 | 10/2003 |
| JP | 2006208542 | 8/2006 |
| TW | 1267447 | 12/2006 |

* cited by examiner

*Primary Examiner* — Frederick Parker
(74) *Attorney, Agent, or Firm* — Altis Law Group, Inc.

(57) ABSTRACT

A method for manufacturing a patterned thin-film layer includes the steps of: providing a substrate with a plurality of banks thereon, the plurality of banks defining a plurality of spaces; providing an ink-jet device comprising a plurality of nozzles for depositing ink therefrom; generating a jetting information about ink volume that each of the nozzles deposits into the respective spaces by a random method, the jetting information meeting ink volume deposited into each of the spaces is in a range from about 92.5% to about 107.5% of an average volume of ink in the spaces; making the nozzles to deposit ink into the respective spaces according to the jetting information; and solidifying the ink so as to form a plurality of patterned thin-film layers formed in the spaces.

20 Claims, 10 Drawing Sheets (a)

(b)

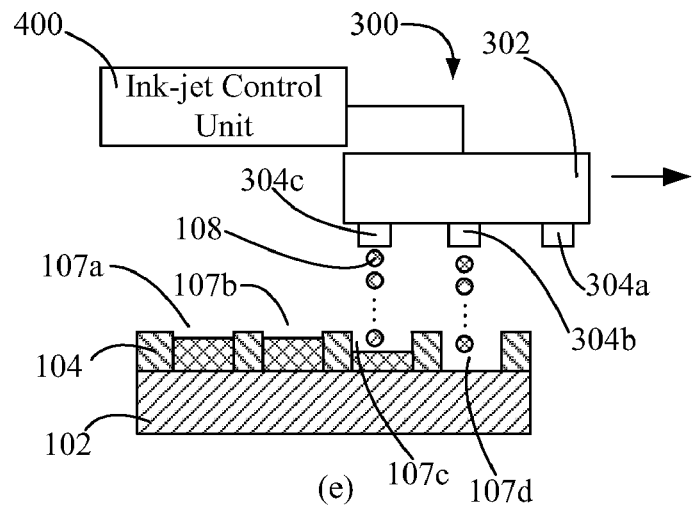
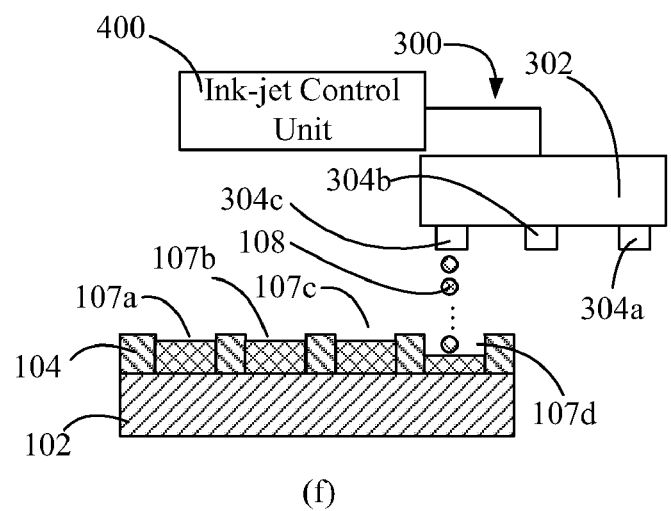
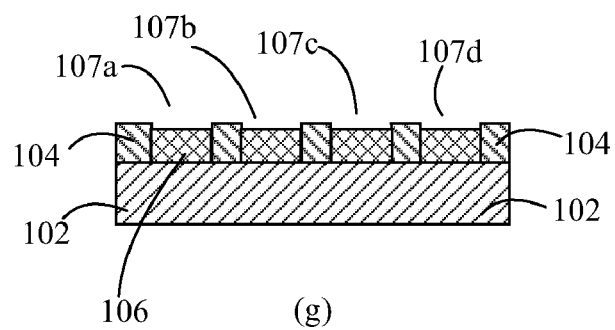
FIG. 7(CONTINUE)

METHOD FOR MANUFACTURING PATTERNED THIN-FILM LAYER

BACKGROUND

1. Technical Field

The present invention generally relates to a method for manufacturing a patterned film on a substrate.

2. Description of Related Art

At present, methods for manufacturing a patterned thin-film layer on a substrate include a photolithographic method and an ink-jet method.

The photolithographic method involves: applying a photoresist layer on a substrate; exposing the photoresist layer using a photo mask with a predetermined pattern; and developing the exposed photoresist layer using the conventional method to form a predetermined patterned thin-film layer. Disadvantage of the conventional photolithographic method is that a large part of the photoresist material is wasted, thus the efficiency is lowered.

The ink-jet method uses an ink-jet device with a number of nozzles for depositing ink into receiving spaces defined by banks on a substrate structure. A patterned thin-film layer is formed after the ink is solidified. Generally, the nozzles of the ink-jet device move over the substrate in a matrix manner to deposit the ink, as needed, on the substrate structure.

In a conventional patterned thin-film layer formed by the ink-jet method, thin-film layers of the same row are made by the same nozzles of the ink-jet device, the uniformities are quite high. However, thin-film layers of the different rows are deposited by different nozzles such that the thicknesses of such thin-film layers are somewhat different. This difference of the non-uniformities of the thin-film layers between different rows causes linear Mura defects.

Therefore, what is needed is a method for manufacturing a patterned thin-film layer with uniform thickness having reduced or no Mura defects.

BRIEF DESCRIPTION OF THE DRAWINGS

Many aspects of the present method for manufacturing patterned thin-film layer can be better understood with reference to the following drawings. The components in the drawings are not necessarily drawn to scale, the emphasis instead being placed upon clearly illustrating the principles of the present and its related method manufacturing patterned thin-film layer. Moreover, in the drawings, like reference numerals designate corresponding parts throughout the several views.

Figure 1:
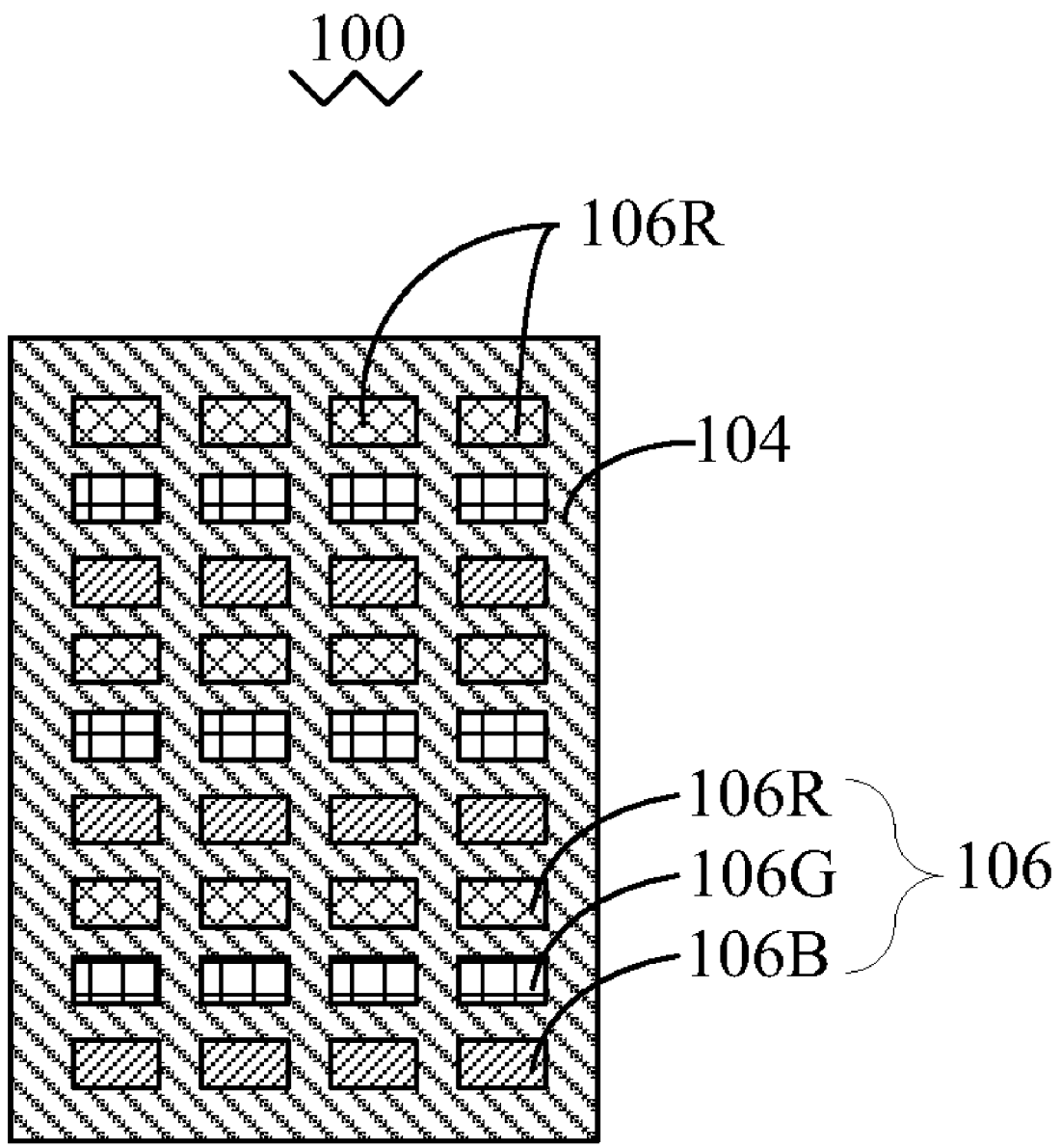
FIG. 1 is a cross-sectional view of a first embodiment of a patterned thin-film layer.

Corresponding reference characters indicate corresponding parts throughout the drawings. The exemplifications set out herein illustrate at least one preferred embodiment of the present method, in one form, and such exemplifications are not to be construed as limiting the scope of the invention in any manner.

DETAILED DESCRIPTION

Reference will now be made to the drawings to describe embodiments of the present method for manufacturing a patterned thin-film layer, in detail.

Figure 2:
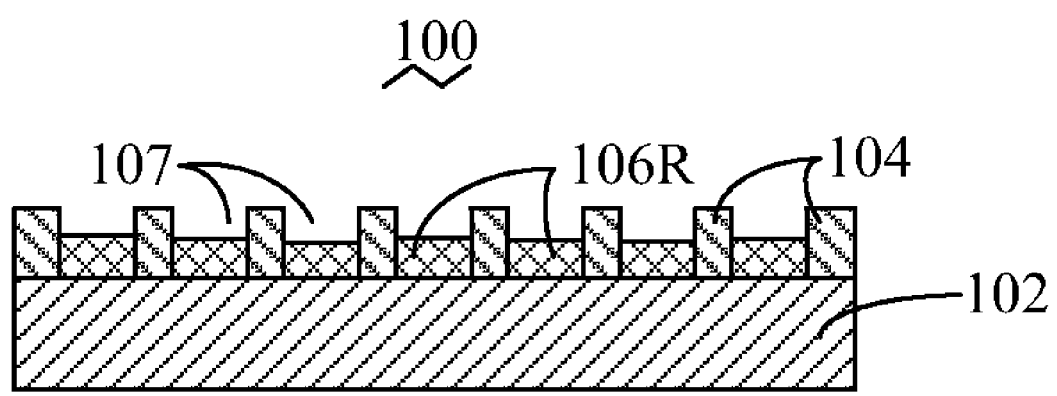
FIG. 2 is cross-sectional view taken along line II-II of FIG. 1.

Referring to FIGS. 1 to 2, a patterned thin-film layer 100 of a first embodiment includes a substrate 102, a plurality of banks 104 formed on the substrate 102 and a plurality of thin-film layers 106.

A material of the substrate 102 is selected from the group consisting of glass, quartz glass, silicon wafer, metal and plastic. The banks 104 cooperatively define a plurality of spaces 107 arranged in rows and columns on the patterned thin-film layer 100.

The plurality of thin-film layers 106 include a plurality of first thin-film layers 106R, second thin-film layers 106G, and third thin-film layers 106B. The plurality of first thin-film layers 106R, second thin-film layers 106G, and third thin-film layers 106B are formed in the spaces 107 in a manner such that thin-film layers 106 in each row are made of a same material, and the thin-film layers 106 in every three rows include the first thin-film layers 106R, the second thin-film layers 106G and the third thin-film layers 106B are arranged in a repeating order.

Figure 3:
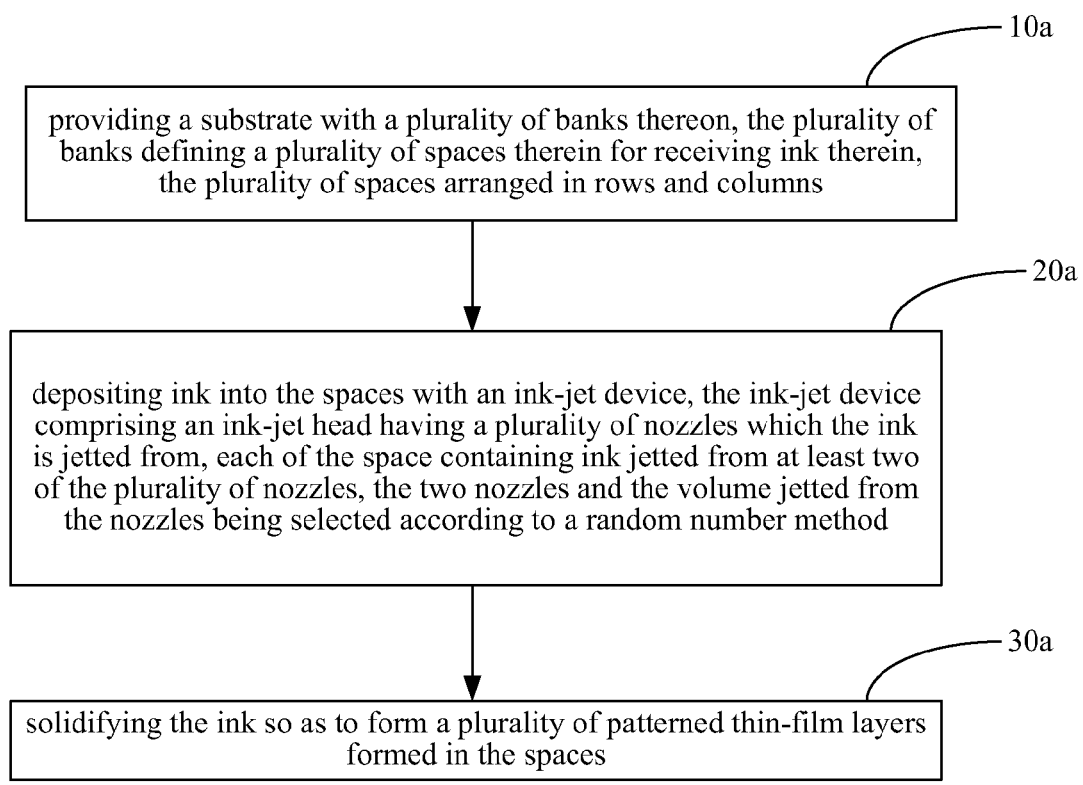
FIG. 3 is a flow chart of a method for manufacturing a patterned thin-film layer in accordance with a second embodiment.

Referring to FIG. 3, a flow chart of a method for manufacturing a patterned thin-film layer in accordance with a second exemplary embodiment is shown. The method includes the following steps:

Step 10a: providing a substrate with a plurality of banks thereon, the plurality of banks defining a plurality of spaces therein for receiving ink therein, the plurality of spaces arranged in rows and columns.

Step 20a: depositing ink into the spaces with an ink-jet device, the ink-jet device comprising an ink-jet head having a plurality of nozzles which the ink is jetted from, each of the space containing ink jetted from at least two of the plurality of nozzles, the two nozzles and the volume jetted from the nozzles being selected according to a random number method.

Step 30a: solidifying the ink so as to form a plurality of patterned thin-film layers formed in the spaces.

The method is described in detail as follows.

Figure 4:
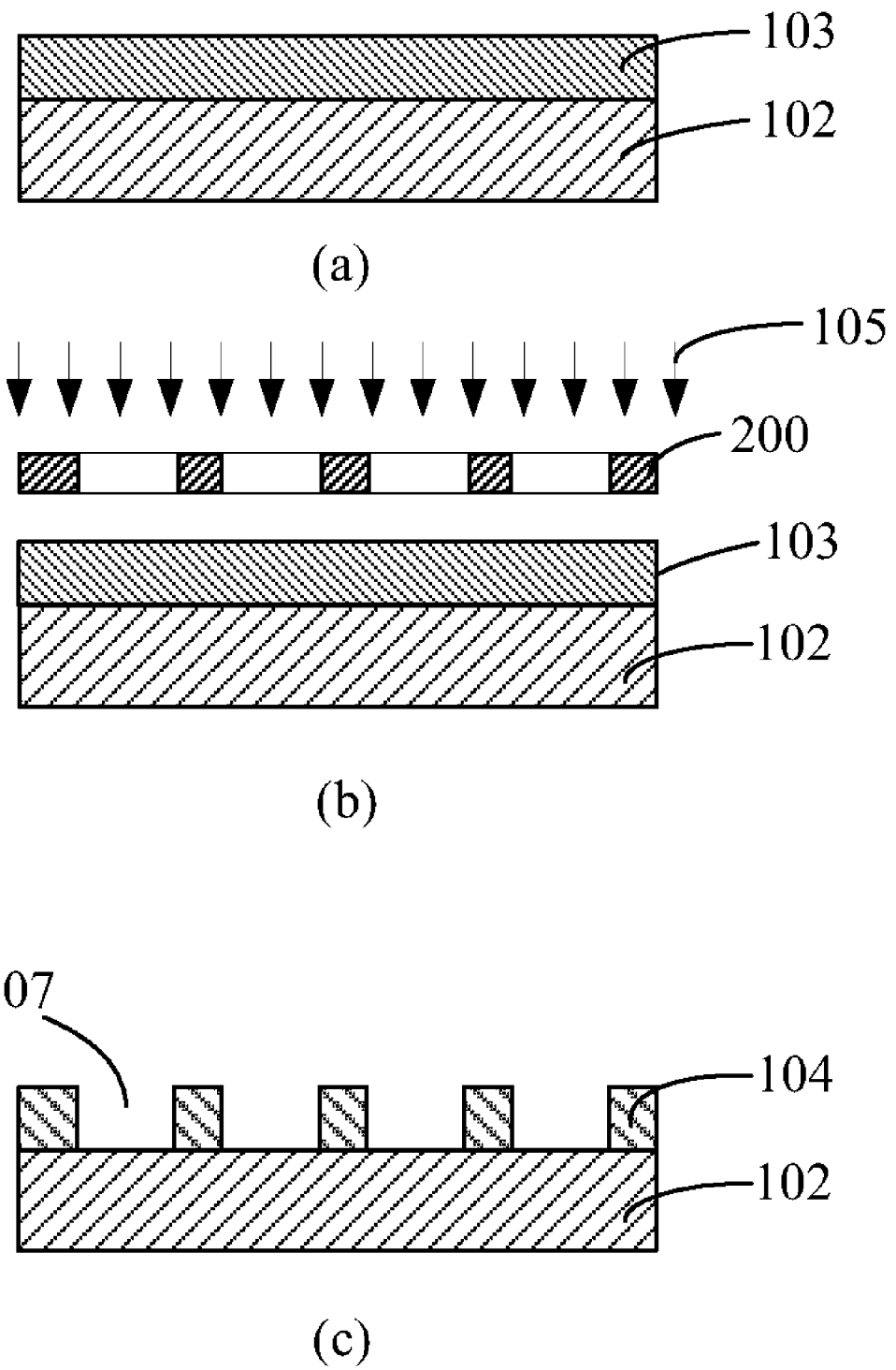
FIGS. 4(a) to 4(c) illustrate a first method for manufacturing a bank on a substrate.

With reference to FIGS. 4(a) to 4(c), in step 10a, a method for manufacturing a substrate 102 with a plurality of banks 104 by a photolithography process is described in more detail below.

Referring to FIG. 4(a), a positive-type photoresist layer 103 can be applied on a surface of the substrate 102 by dry film lamination, wet spin coating, wet slit coating, slit-spin coating or dry film lamination. A material of the substrate 102 is selected from the group consisting of glass, quartz glass, silicon wafer, metal and plastic.

Referring to FIG. 4(b), the positive-type photoresist layer 103 is exposed using a photo mask 200 disposed between the positive-type photoresist layer 103 and a light-exposure device (not shown). The photo mask 200 has a predetermined pattern. The light-exposure device may be an UV light source. The light-exposure device emits light beams 105 that impinges on the positive-type photoresist layer 103.

Referring to FIG. 4(c), the exposed parts of the positive-type photoresist layer 103 is removed by a developing process to form a patterned photoresist layer serving as the plurality of banks 104. The plurality of banks 104 defines a plurality of spaces 107 therein. Generally, the spaces 107 are arranged in rows and columns.

Figure 5:
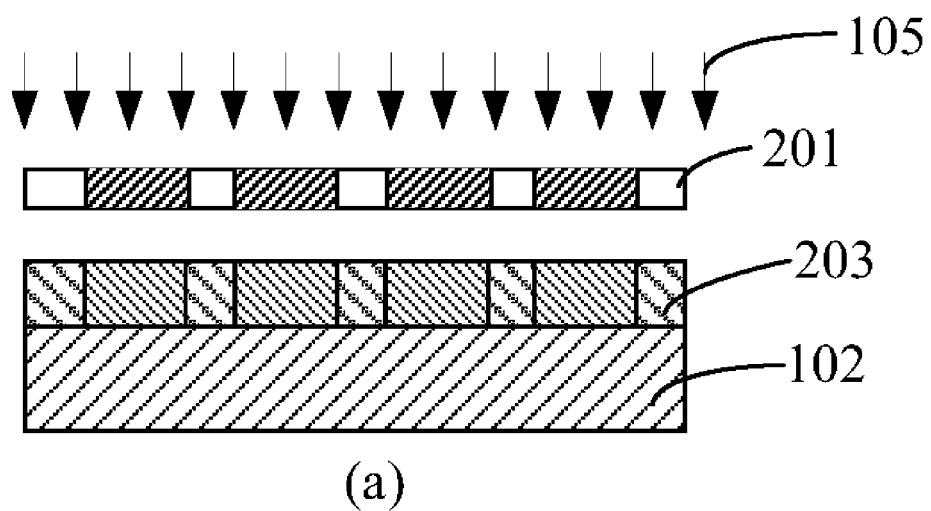
FIGS. 5(a) to 5(b) illustrate a second method for manufacturing a bank on a substrate.
Figure 5:
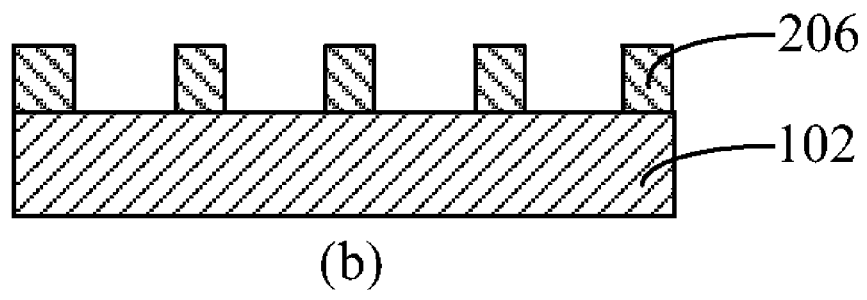

Referring to FIGS. 5(a) and 5(b), another method for manufacturing the substrate 102 with a plurality of banks 206 is illustrated. The method is described in more detail below. With reference to FIG. 5(a), a negative-type photoresist layer 203 is applied on a surface of the substrate 102. The negative-type photoresist layer 203 is exposed using a photo mask 201 disposed between the negative-type photoresist layer 103 and UV light beams 105. The photo mask 201 has a predetermined pattern for the patterned thin-film layer. Referring to FIG. 5(b), unexposed parts of the negative-type photoresist layer 203 are removed by a developing process. Then a patterned photoresist layer, which serves as the plurality of banks 204, is formed.

Figure 6:
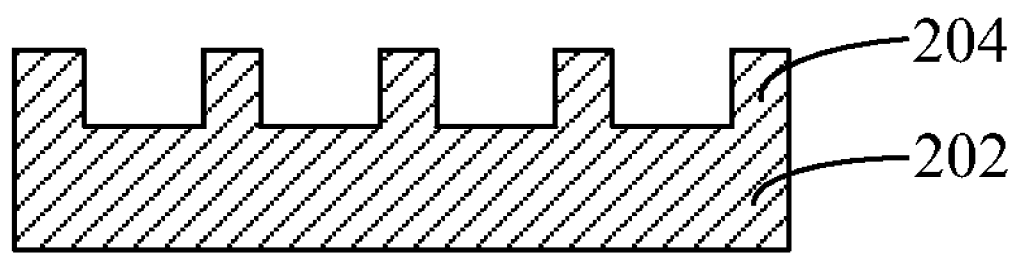
FIG. 6 is a cross-sectional view of a bank manufacturing by an injection molding method.

In addition, the plurality of banks 104 and the substrate 102 may also be integrally molded using an injection molding process, as shown in FIG. 6. For example, a mold insert with a predetermined pattern corresponding to the patterned thin-film layer 106 (shown in FIG. 2) received into a mold. A molten material of the substrate is injected into the mold. After being cooled, the molded substrate is removed from the mold. Then a substrate 202 with a plurality of banks 204 thereon is formed. A material of the substrate 202 is selected from the group consisting of glass, quartz glass, metal and plastic.

Figure 7:
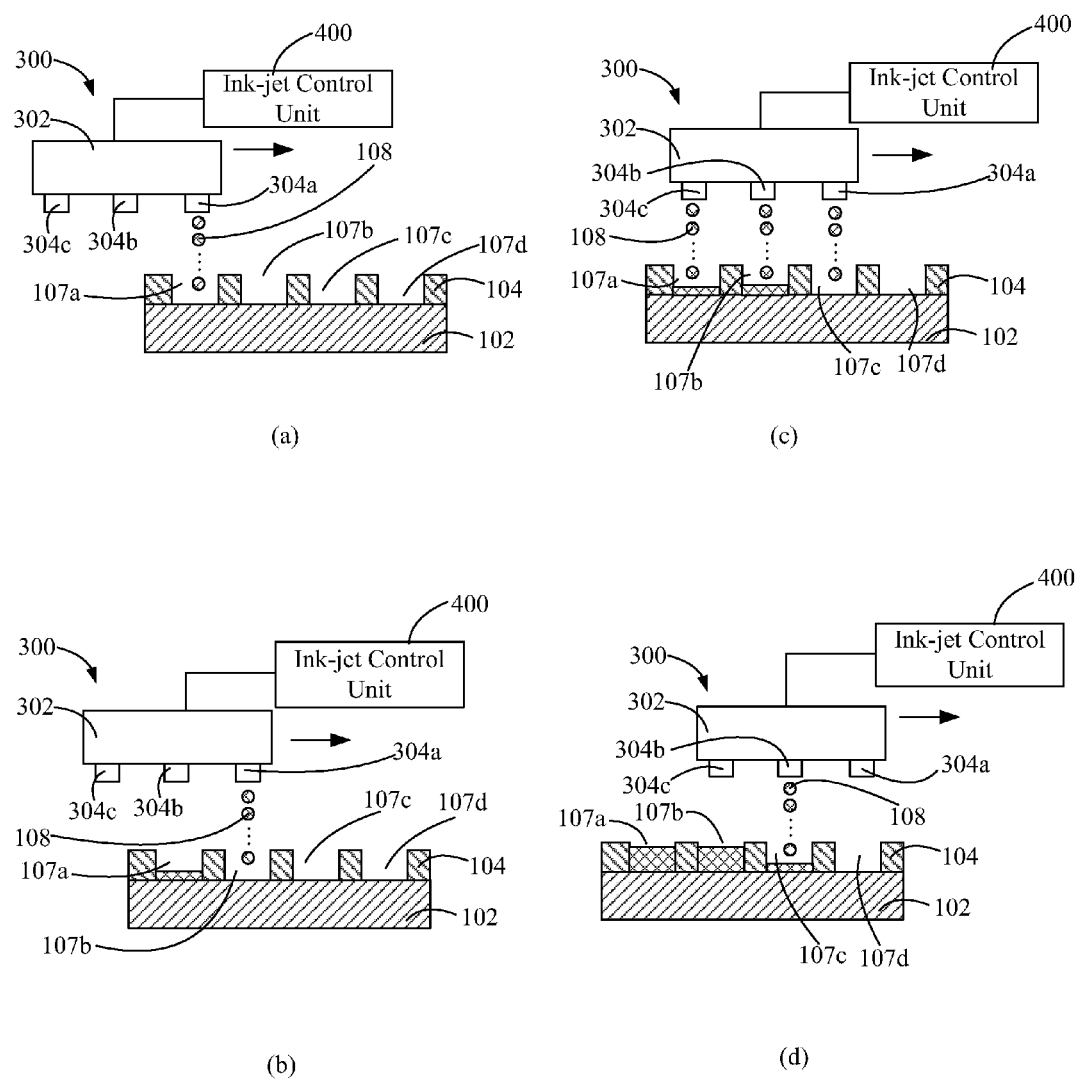
FIGS. 7(a) to 7(g) illustrate a method for manufacturing a patterned thin-film layer.

Referring to FIG. 7 along with the flowchart of FIG. 3, in step 20a, an ink-jet device 300 is provided for depositing ink into the spaces 107. The ink-jet device 300 includes an ink-jet head 302 and an ink-jet control unit 400. In this embodiment, the ink-jet head 302 includes three nozzles 304a, 304b and 304c arranged in a line, in the order written. The ink-jet control unit 400 is configured for controlling the ink-jet head 302 to force ink through the nozzles 304a, 304b and 304c and also to control the volume of the ink deposited from the nozzles 304a, 304b and 304c. In this step, the spaces 107 include four spaces 107a, 107b, 107c and 107d in a same row and arranged in the order written. The process of depositing ink into the spaces 107a, 107b, 107c and 107d using the ink-jet device 300 is described in detail as follows.

Firstly, a jetting information table is generated by a random method. In this embodiment, the jetting information table is shown as Jetting Information Table One (JIT One for short, see table below). The JIT One includes a set of random data about the number of drops of ink from each the nozzles 304a, 304b and 304c into each of the spaces 107a, 107b, 107c and 107d. A volume of one drop of ink deposited from each of the nozzles 304a, 304b and 304c may vary by corresponding driving signals. The random data in the JIT One meets the following: 1) each of the spaces 107a, 107b, 107c and 107d receives ink deposited from at least two of the three nozzles the nozzles 304a, 304b and 304c; 2) the volume of ink in each of the space 107a, 107b, 107c and 107d is in a range from about 92.5% to about 107.5% of an average volume of ink in the spaces in the same row, and preferably in a range about 97% to about 103% (in this embodiment, the total drop number of ink received in each space is 20).

| Jetting Information Table One | | | | |
|---|---|---|---|---|
| | Spaces Ink (drops) | | | |
| Nozzles | 107a | 107b | 107c | 107d |
| 304a | 5 | 7 | 5 | 0 |
| 304b | 0 | 13 | 8 | 9 |
| 304c | 15 | 0 | 7 | 11 |
| Total | 20 | 20 | 20 | 20 |

The set of jetting information in the JIT One can be obtained from a random number table or a hash table in mathematics, or generated by computer instructions selected from the group consisting of RND( ), RAND( ), and Randomize, or generated by a Nonperiodic Function, or a periodic function that the repeating period is greater than the total number of the spaces in a substrate which can be loaded by an ink-jet device or greater than the total number of spaces in a substrate.

Secondly, the jetting information of JIT One is transmitted to the ink-jet control unit 400. The nozzles 304a, 304b, and 304c are driven to deposit ink under the control of the ink-jet control unit 400 based on the random data in the JIT One.

Referring to FIG. 7(a), the nozzle 304a is moved over to the space 107a. According to the JIT One, five drops of ink are deposited from the nozzle 304a into the space 107a.

Referring to FIG. 7(b), the ink-jet head 302 continues to move over the banks 104. The nozzle 304a is moved over to the space 107b, and the nozzle 304b is moved over to the space 107a. According to the JIT One, seven drops of ink are deposited from the nozzle 304a into the space 107b and no ink is deposited from the nozzle 304b into the space 107a.

Referring to FIG. 7(c), the ink-jet head 302 continues to move over the banks 104. The nozzle 304a is moved over to the space 107c, the nozzle 304b is moved over to the space 107b, and the nozzle 304c is moved over to the space 107a. According to the JIT One, five drops of ink are deposited from the nozzle 304a into the space 107c, thirteen drops of ink are deposited from the nozzle 304b into the space 107b and fifteen drops of ink are deposited from the nozzle 304c into the space 107a.

Referring to FIG. 7(d), the ink-jet head 302 continues to move over the banks 104. The nozzle 304a is moved over to the space 107d, the nozzle 304b is moved over to the space 107c, and the nozzle 304c is moved over to the space 107b. According to the JIT One, no ink is deposited from the nozzle 304a into the space 107d, eight drops of ink are deposited from the nozzle 304b into the space 107c and no ink is deposited from the nozzle 304c into the space 107b.

Referring to FIG. 7(e), the ink-jet head 302 continues to move over the banks 104. The nozzle 304a is moved beyond the top area of the space group 107. The nozzle 304b is moved over to the space 107d, and the nozzle 304c is moved over to the space 107c. According to the JIT One, nine drops of ink are deposited from the nozzle 304b into the space 107d, and seven drops of ink are deposited from the nozzle 304c into the space 107c.

Referring to FIG. 7(f), the ink-jet head 302 continues to move over the banks 104. The nozzle 304b is moved beyond the top area of the space group 107. The nozzle 304c is moved over to the space 107d. According to JIT One, eleven drops of ink are deposited from the nozzle 304c into the space 107d.

Referring to FIG. 7(g), after the above processes shown from FIG. 7(a) to FIG. 7(f), each of the spaces 107a, 107b, 107c, and 107d contains twenty drops of ink. Other spaces defined by the banks 104 are loaded under the control of the ink-jet control unit 400 based on the JIT One or other jetting information tables.

In this example, the JIT table is pre-determined before ink-jet device making the thin-film pattern. Of course, we the number of drops for each space by random method can also be determined during making the thin-film pattern. In this embodiment, the JIT of the thin-film pattern which we made could only be known after we finish making it. But for mass production considering, pre-determining the JIT will be more applicable since lower speed of processor and data transmitting between processor and ink-jet device are used.

Referring to FIG. 7(g) again, in step 30a, the ink in the spaces 107a, 107b, 107c and 107d is solidified by a solidifying device (not shown), such as a heating device, a vacuum-pumping device, or an ultraviolet light source. As a result, a plurality of thin-film layers 106 are formed in the spaces 107 in a manner such that the thin-film layers 106 in each row, made of a same material, have the same thickness. Also, the thin-film layers 106 in every three rows comprise the first thin-film layers, the second thin-film layers and the third thin-film layers arranged in a regular repeating order. Thus, a thin-film layer structure 100 is formed as shown in FIGS. 1 and 2.

Then another substrate 102 with the plurality of banks 104 formed thereon. The steps shown in FIG. 7 are repeated until a predetermined number of substrates 102 have respective patterned layers formed.

Figure 8:
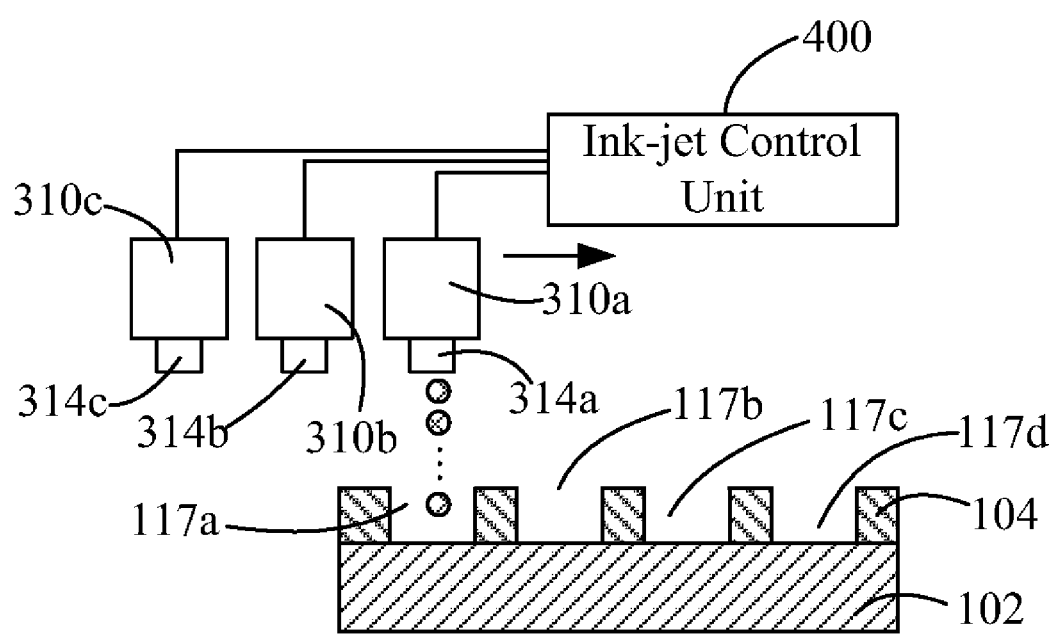
FIG. 8 illustrates another manufacturing method of a patterned thin-film layer.

It is to be understood that the spaces in a same row can also be loaded by more than one ink-jet head. The number of the JIT can also be more than one. With reference to FIG. 8, nozzles 314a, 314b and 314c are included by the ink-jet heads 310a, 310b and 310c, respectively. The spaces 107a, 107b, 107c and 107d are loaded by the nozzles 314a, 314b and 314c based on JIT One shown above. In the exemplary embodiment of FIG. 8, the ink-jet heads 310a, 310b and 310c can be a same type or different types. The ink-jet heads 310a, 310b and 310c can be bonded to move together or can move separately. The ink-jet heads 310a, 310b and 310c can also belong to different ink-jet devices, as long as the drop numbers from each of the nozzles 314a, 314b and 314c to each of the spaces 107a, 107b, 107c and 107d meet the JIT.

Certainly, the volume of one drop ink deposited from one nozzle can vary by applying different driving signals to the ink-jet head corresponding to different nozzles, as long as the volume of ink in each space is in a range from about 92.5% to about 107.5% of an average volume of ink in the spaces in the same row.

It is to be understood that the number of the nozzles and the number of the spaces can vary according to need. The random data should correspond to the number of nozzles and that of the spaces. In addition, the driving signals applied to the nozzles can be adjusted in order that the volume of ink in each space is in the range from about 92.5% to about 107.5% of an average volume of ink in the spaces in the same row, and preferably in the range from about 97% to about 103%. The drop number of ink received by each of the spaces should be greater than twelve, and preferably greater than fifteen.

The jetting information can also be generated at the time that the nozzles moves over the spaces. It is described in detail as follows:

Referring to FIG. 7(a), when the nozzle 304a moves over the space 107a, the random data corresponding to the nozzle 304a and the space 107a is generated. The random data is transmitted to the ink-jet control unit 400. For example, the random data is five. Then five drops of ink are deposited from the nozzle 304a into the space 107a.

Referring to FIG. 7(b), when the nozzle 304a moves over the space 107b and the nozzle 304b moves over the space 107a. A first random data corresponding to the 304a and the space 107b and a second random data corresponding to the 304b and the space 107a are generated and transmitted to the ink-jet control unit 400. In this embodiment, the first random data is seven and the second random data is zero. Then seven drops of ink deposited from the nozzle 304a into the space 107b. Similarly, the spaces 107a, 107b, 107c and 107d are loaded with ink by the nozzles 304a, 304b and 304c.

Alternatively, the spaces 107a, 107b, 107c and 107d can be loaded by one of the nozzles 304a, 304b and 304c at a time. The selection of the nozzles 304a, 304b and 304c corresponding to each of the spaces 107a, 107b, 107c, and 107d is based on a jetting information table. In this embodiment, the jetting information table is shown in a Jetting Information Table Two (JIT Two for short). The JIT Two meets: 1) each of the spaces 107a, 107b, 107c and 107d is loaded by only one nozzle at a time; 2) the drop number of the ink deposited into each of the spaces 107a, 107b, 107c and 107d is 20. In this embodiment, simultaneously depositing ink from the three nozzles 304a, 304b, and 304c should be avoided. For example, when the ink-jet head 302 is moved to a position as shown in FIG. 7(c), it should be avoided that ink are deposited from the three nozzles 304a, 304b, and 304c to load the three spaces 107c, 107b and 107a, respectively.

| Jetting Information Table Two | | | | |
|---|---|---|---|---|
| | Spaces Ink (drops) | | | |
| Nozzles | 107a | 107b | 107c | 107d |
| 304a | 20 | 0 | 0 | 0 |
| 304b | 0 | 0 | 20 | 20 |
| 304c | 0 | 20 | 0 | 0 |

In addition, each of the spaces 107a, 107b, 107c and 107d can be loaded by one or more than one nozzle. For example, the spaces 107a, 107b, 107c and 107d can be loaded based on a Jetting Information Table Three (JIT Three). The JIT Three meets the drop numbers of ink received by the spaces 107a, 107b, 107c and 107d are the same.

| Jetting Information Table Three | | | | |
|---|---|---|---|---|
| | Spaces Ink (drops) | | | |
| Nozzles | 107a | 107b | 107c | 107d |
| 304a | 6 | 0 | 8 | 0 |
| 304b | 11 | 0 | 0 | 20 |
| 304c | 3 | 20 | 12 | 0 |
| Total | 20 | 20 | 20 | 20 |

The volume of ink in each space is in a range from about 92.5% to about 107.5% of an average volume of ink in the spaces in the same row, and volumes of ink in the spaces are irregularly distributed. Therefore, the volumes of ink in the spaces in each row show uniform distribution as a whole. In addition, the spaces in a same column are loaded at different time and the loading order of the spaces in time is irregular.

Each space is loaded based on a random method. Thus, linear Mura defects caused by the regular solidifying order of the ink in the spaces of the same column are prevented. Therefore, linear Mura defects can be reduced or avoided when light passes through the patterned thin-film layer. Generally, drops of ink deposited from a same nozzle have a substantially same volume. The volume error between two different nozzles may occur due to machining errors of the ink-jet head. In this embodiment, each space is loaded by at least two nozzles at different time so that the volume errors can be prevented. The volumes of the ink in the spaces show uniform distribution as a whole. Therefore, linear Mura defects can be reduced or avoided when light passes through the patterned thin-film layer.

Figure 9:
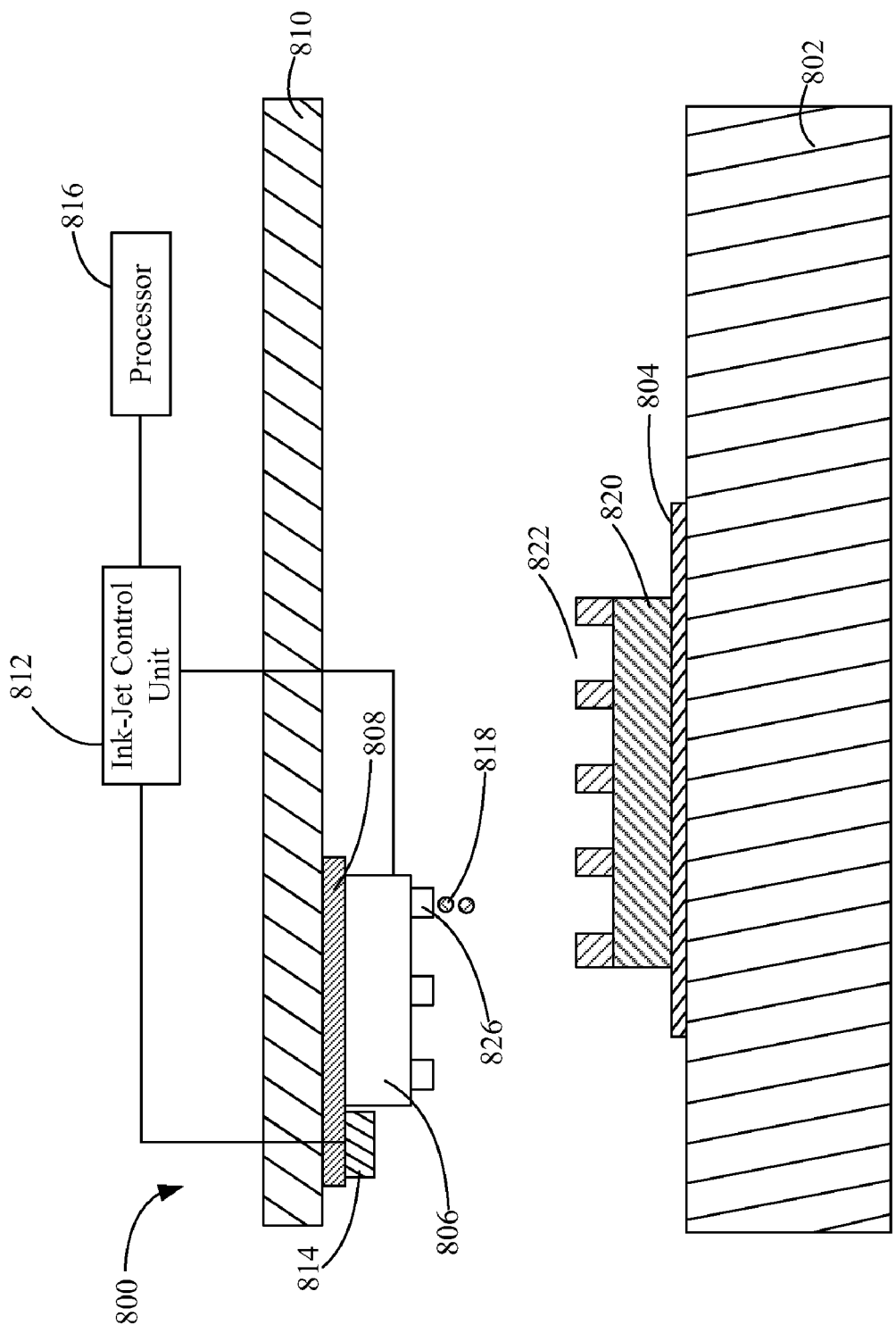
FIG. 9 is a cross-sectional view of a third embodiment of a machine for manufacturing the patterned thin-film layer.

Referring to FIG. 9, a machine 800 for manufacturing the patterned thin-film layer 100 in accordance with a third exemplary embodiment comprises a base 802, a substrate support 804, an ink-jet head 806, a sliding block 808, a slide rail 810, an ink-jet control unit 812, a driving motor 814 and a processor 816. The ink-jet head 806 is mounted on the sliding block 808. The sliding block 808 is slidable along the slide rail 810. The ink-jet head 806 includes a plurality of nozzles 826 which ink 818 received in the ink-jet head 806 is deposited out of. The substrate 804 is configured for supporting another substrate 820 with a plurality of banks formed thereon. The processor 816 can generate a random number data about ink volume information that the nozzles 826 deposits into the spaces defined by the banks. The random number data requires that the volume of ink in each of the space is in a range from about 92.5% to about 107.5% of an average volume of ink in the spaces in the same row, and preferably in a range from about 97% to about 103%. The ink-jet control unit 812 is configured for controlling the sliding block 808 to slide along the slide rail 810 and controlling the ink-jet head to depositing ink into spaces defined by the banks based on the ink volume information received from the processor 816. In this embodiment, the sliding block 808 is driven to slide along the slide rail 810 by the driving motor 814.

It should be noted that the thin-film layer structure can be used in devices such as, color filters and organic light emitting display devices. The method and machine for manufacturing the thin-film layer structure can be used to manufacture the above-mentioned devices. In the manufacturing of color filters, the method and machine can be used to manufacture RGB (red, green, and blue) color layers. Correspondingly, the banks mentioned above can include single layer banks (using black matrix only as the bank), or multi-layer banks (using black matrix and one or more top layers on the black matrix as the bank). This method can also be used to manufacture, for example, emission-material layers, electron-transfer layers, hole-transfer layers and electron-ejection layers.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A method for manufacturing a patterned thin-film layer, comprising:
   (a): providing a substrate with a plurality of banks thereon, the plurality of banks defining a plurality of spaces;
   (b): providing an ink jet device comprising a plurality of nozzles for depositing ink therefrom;
   (c): generating a jetting information about ink volume that each of the nozzles deposits into the respective spaces by a random method, the jetting information meeting ink volume deposited into each of the spaces is in a range from about 92.5% to about 107.5% of an average volume of ink in the spaces;
   (d): making the nozzles to deposit ink into the respective spaces according to the jetting information;
   (e): solidifying the ink so as to form a plurality of patterned thin-film layers formed in the spaces; and
   (f): providing another substrate with a plurality of banks thereon, repeating steps (d) and (e) until a predetermined number of substrates have respective patterned layers formed.

2. The method as claimed in claim 1, further comprising a sub-step of: transmitting the jetting information into an ink-jet control unit, the ink-jet control unit being configured for controlling the nozzles to deposit ink according to the jetting information, between step (c) and step (d).

3. The method as claimed in claim 1, wherein the jetting information meets at least one of the spaces is loaded by at least two of the nozzles.

4. The method as claimed in claim 1, wherein the jetting information meets each of the space is loaded by at least two of the nozzles.

5. The method as claimed in claim 1, wherein the number of the nozzles is less than the number of the spaces, each of the space being loaded by one of the nozzles, the number of depositing nozzles at a time being less than the total number of the nozzles.

6. The method as claimed in claim 1, wherein in depositing process, moving each of the nozzles over all of the spaces and depositing ink to spaces according to the jetting information.

7. The method as claimed in claim 1, wherein the jetting information is generated by computer instructions selected from the group consisting of RND( ), RAND( ), and Randomize, or generated by a Nonperiodic Function, or a periodic function that the repeating period is greater than the total number of the spaces in a substrate which is loaded by an ink jet device or greater than the total number of spaces in a substrate.

8. The method as claimed in claim 1, wherein the jetting information is obtained from a random number table or a hash table.

9. The method as claimed in claim 1, wherein the jetting meets ink volume deposited into each of the spaces is in a range from about 97% to about 103% of an average volume of ink in the spaces.

10. The method as claimed in claim 1, wherein after the step of making the nozzles to deposit ink into the spaces, each of the spaces receives more than twelve drops of ink.

11. The method as claimed in claim 1, wherein after the step of making the nozzles to deposit ink into the spaces, each of the spaces receives more than fifteen drops of ink.

12. The method as claimed in claim 1, wherein the nozzles is driven by driving signals to deposit ink, one of the driving signal corresponding to one of the nozzles being different from the others.

13. The method as claimed in claim 1, wherein the jetting information consists of information about ink volume deposited from each of the nozzles into each of the spaces in one row.

14. The method as claimed in claim 1, wherein the jetting information comprises information about ink volume deposited from each of the nozzles into each of the spaces on the substrate.

15. A method for manufacturing a patterned thin-film layer, comprising:
- (a): providing a substrate with a plurality of banks thereon, the plurality of banks defining a plurality of spaces;
- (b): providing three ink jet heads receiving red, green, blue ink respectively, each of the three ink-jet heads comprising a plurality of nozzles for depositing ink therefrom;
- (c): generating a jetting information about ink volume that each of the nozzles of the three ink jet heads deposits into the corresponding spaces by a random method, the jetting information meeting ink volume deposited into each of the spaces is in a range from about 92.5% to about 107.5% of an average volume of ink in the spaces;
- (d): making the nozzles to deposit ink into the spaces according to the random number data;
- (e): solidifying the ink so as to form a plurality of red, green, blue color layers formed in the spaces; and
- (f): providing another substrate with a plurality of banks thereon, repeating the steps (d) and (e) until a predetermined number of substrates have respective red, green, blue color layers formed.

16. The method as claimed in claim 15, wherein the spaces are arranged in rows and columns.

17. The method as claimed in claim 15, wherein the jetting information is generated by computer instructions selected from the group consisting of RND( ), RAND( ), and Randomize, or generated by a Nonperiodic Function, or a periodic function that the repeating period is greater than the total number of the spaces in a substrate which is loaded by an ink jet device or greater than the total number of spaces in a substrate.

18. The method as claimed in claim 15, wherein the jetting information is obtained from a random number table or a hash table.

19. The method as claimed in claim 15, wherein after the step of depositing ink from the nozzles to into the spaces, each of the spaces receives more than fifteen drops of ink.

20. The method as claimed in claim 15, wherein in each of the ink jet head, the nozzles are driven by driving signals to deposit ink, one of the driving signals corresponding to one of the nozzles being different from the others.

* * * * *